(12) United States Patent
Yasugi

(10) Patent No.: US 8,084,892 B2
(45) Date of Patent: Dec. 27, 2011

(54) POWER SUPPLY DEVICE AND METHOD

(75) Inventor: Akira Yasugi, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/926,721

(22) Filed: Dec. 7, 2010

(65) Prior Publication Data

US 2011/0140534 A1 Jun. 16, 2011

Related U.S. Application Data

(60) Provisional application No. 61/344,129, filed on May 28, 2010.

(51) Int. Cl.
*H01H 83/12* (2006.01)
*H01H 47/00* (2006.01)

(52) U.S. Cl. ............... 307/129; 307/31; 307/38; 307/52; 307/80; 307/82; 307/85; 307/86; 307/87; 307/125; 307/130; 307/151

(58) Field of Classification Search .................... 307/31, 307/38, 52, 80, 82, 85–87, 116, 125, 129–130, 307/151
See application file for complete search history.

(56) References Cited

U.S. PATENT DOCUMENTS

| | | | | |
|---|---|---|---|---|
| 5,473,528 | A * | 12/1995 | Hirata et al. ..................... | 363/71 |
| 5,745,356 | A * | 4/1998 | Tassitino et al. ................ | 363/71 |
| 7,450,406 | B2 * | 11/2008 | Glauser ........................... | 363/71 |
| 7,514,809 | B2 * | 4/2009 | Edenfeld .......................... | 290/44 |
| 7,755,209 | B2 * | 7/2010 | Jones et al. ...................... | 290/44 |
| 7,804,183 | B2 * | 9/2010 | Arinaga .......................... | 290/44 |
| 7,808,126 | B2 * | 10/2010 | Stiesdal .......................... | 307/84 |
| 7,884,492 | B2 * | 2/2011 | Xiong et al. .................... | 290/55 |
| 7,919,879 | B2 * | 4/2011 | Flannery et al. ................. | 290/44 |
| 2002/0103745 | A1 * | 8/2002 | Lof et al. ......................... | 705/37 |
| 2003/0227785 | A1 * | 12/2003 | Johnson, Jr. .................... | 363/37 |
| 2007/0267873 | A1 | 11/2007 | Teichmann | |
| 2009/0230689 | A1 | 9/2009 | Burra et al. | |
| 2009/0302608 | A1 * | 12/2009 | Andresen ........................ | 290/44 |
| 2010/0109328 | A1 * | 5/2010 | Li et al. ........................... | 290/44 |
| 2010/0156192 | A1 * | 6/2010 | Wang et al. ..................... | 307/82 |
| 2010/0213712 | A1 * | 8/2010 | Arinaga et al. ................. | 290/44 |
| 2010/0292852 | A1 * | 11/2010 | Gertmar et al. ............... | 700/287 |

FOREIGN PATENT DOCUMENTS

| | | |
|---|---|---|
| EP | 2 101 392 | 9/2009 |
| JP | 2003-243011 | 8/2003 |
| JP | 2006-228436 | 8/2006 |

* cited by examiner

*Primary Examiner* — Jared Fureman
*Assistant Examiner* — Adi Amrany
(74) *Attorney, Agent, or Firm* — Manabu Kanesaka; Kenneth M. Berner; Benjamin J. Hauptm

(57) ABSTRACT

An object is to provide a duplex power supply for auxiliary machines. A power supply device includes a switching section that is connected to a direct-current link between a generator-side inverter and a grid-side inverter via an auxiliary machine power inverter for converting direct-current power supplied from the direct-current link into alternating-current power to form a first path, that is connected somewhere between a power-converting section and a utility grid to form a second path, and that is connected to auxiliary machines to form a third path, and the switching section switches between connection of the third path to the first path and connection of the third path to the second path.

13 Claims, 4 Drawing Sheets

POWER SUPPLY DEVICE AND METHOD

This application claims the benefit of U.S. Provisional Application No. 61/344,129, filed on May 28, 2010, the content of which is incorporated herein by reference.

TECHNICAL FIELD

The present invention relates to power supply devices and methods.

BACKGROUND ART

Wind turbine generators that generate electricity by means of natural energy, namely, wind force, are conventionally known. In one wind turbine generator, for example, a rotor head equipped with wind turbine rotating blades, a main shaft coupled to the rotor head so as to rotate together therewith, a gearbox to which the main shaft is coupled so as to rotate as the wind turbine rotating blades receive wind force, and a generator driven by the shaft output of the gearbox are provided on a nacelle mounted on a tower. In the thus-configured wind turbine generator, the rotor head equipped with the wind turbine rotating blades, which convert wind force into torque, and the main shaft are rotated to generate a shaft output, and the gearbox coupled to the main shaft transfers the shaft output to the generator while increasing the rotational speed thereof. Thus, the shaft output generated by converting wind force into torque serves as a driving source for the generator, and wind force can be used as a power source for the generator to generate electricity.

CITATION LIST

Patent Literature

{PTL 1}
U.S. Patent Application, Publication No. 2009/0230689, specification

To operate a wind turbine generator, auxiliary machines such as a governing oil pump, a lubricant oil pump, and a ventilating fan are required, and power supply to such auxiliary machines is an important issue.

For example, Patent Literature 1 proposes a technique for supplying power from a DC link (direct-current link) to auxiliary machines in an AC-DC-AC wind turbine generator with variable speed control of a generator.

SUMMARY OF INVENTION

Technical Problem

The method in Patent Literature 1 above, however, has a problem in that a single path for supplying power to the auxiliary machines is provided from the DC link, without redundancy.

An object of the present invention, which has been made to solve the above problem, is to provide a power supply device and method that allow a duplex auxiliary machine power supply to be configured.

Solution to Problem

To achieve the above object, the present invention provides the following solutions.

A first aspect of the present invention is a power supply device applied to a power generation system including a power generation apparatus for generating electricity by means of natural energy and a power-converting section including a first converter for converting alternating-current power received from the power generation apparatus into direct-current power and a second converter for converting the direct-current power into alternating-current power matching the frequency of a utility grid, to supply power to auxiliary machines for the power generation apparatus. The power supply device includes a switching section that is connected to a first path connected to a direct-current link between the first converter and the second converter via a third converter for converting direct-current power supplied from the direct-current link into alternating-current power, that is connected to a second path connected somewhere between the power-converting section and the utility grid, and that is connected to a third path connected to the auxiliary machines, and the switching section switches between connection of the third path to the first path and connection of the third path to the second path.

According to this aspect, alternating-current power generated by means of natural energy is converted into direct-current power by the first converter and is converted into alternating-current power matching the frequency of the utility grid by the second converter. The first path is formed by connecting the direct-current link between the first converter and the second converter to the switching section via the third converter for converting the direct-current power supplied from the direct-current link into alternating-current power, the second path is formed by connecting somewhere between the power-converting section and the utility grid to the switching section, and the third path is formed by connecting the switching section to the auxiliary machines. The switching section is switched to switch between the connection of the third path to the first path and the connection of the third path to the second path.

In this way, by switching the switching section, the power supplied to the auxiliary machines can be supplied either from the direct-current link of the power-converting section or from the line between the power-converting section and the utility grid. Accordingly, a plurality of paths for supplying power to the auxiliary machines can be formed, thus providing a redundant auxiliary machine power supply.

In addition, for example, when the first path is connected to the third path by switching the switching section, the second path is not connected to the third path and therefore does not supply power to the auxiliary machines, thus allowing an inspection procedure on a breaker, a lamp, etc. provided in the second path.

In the above aspect, a control section that controls the switching section depending on at least one of the status of the utility grid and the status of the third converter may be provided.

Because the switching section is controlled depending on at least one of the status of the utility grid (for example, grid frequency or voltage) and the status of the third converter (for example, the presence or absence of an abnormal condition in the third converter), the control can be performed such that, for example, the switching section is switched so as to supply the auxiliary machines with power from the third converter if the frequency of the utility grid becomes unstable and is switched so as to supply the auxiliary machines with power from the utility grid if the third converter is in an abnormal condition, thus continuing the operation of the auxiliary machines.

In the above configuration, preferably, the control section connects the third path to the first path by synchronous switching of the switching section if at least one of the frequency and voltage at the utility grid is predicted to vary by a predetermined amount or more.

In this way, the third path is connected to the first path by synchronous switching if the frequency or voltage at the utility grid is predicted to vary by a predetermined amount or more. For example, if lightning is predicted according to weather information, and it is predicted to cause frequency variations or voltage variations at the utility grid, the auxiliary machines can be supplied with power from the direct-current link so that they can continue to operate irrespective of changes in the status of the utility grid. In addition, synchronous switching can be selected because the switching is performed according to prediction in advance with sufficient time before the weather information changes, thus allowing switching without momentary interruption.

In the above configuration, preferably, the second path is connected to the third path in normal operation, and the control section controls the switching section so as to connect the first path to the third path if the frequency of the utility grid is at or above a first predetermined range serving as an allowable range of variation.

The second path is connected to the third path in normal operation, and switching is performed so as to supply the auxiliary machines with power from the direct-current link of the power-converting section if a variation in the frequency of the utility grid is at or above the first predetermined range. Thus, for example, if the grid frequency varies to such an extent as to stop the auxiliary machines (or cause the auxiliary machines to affect the operation of the power generation apparatus) even though the power generation apparatus can be operated, the auxiliary machines can be supplied with power from the power-converting section by switching the switching section to continue supplying power to the auxiliary machines while operating the power generation apparatus, thus preventing the auxiliary machines from stopping. Here, the normal operation means operation without variations in the frequency of the utility grid.

In the above configuration, preferably, the second path is connected to the third path in normal operation, and the control section controls the switching section so as to connect the second path to the third path if the frequency of the utility grid is at or below a second predetermined range smaller than a first predetermined range serving as an allowable range of variation.

Even if the frequency of the utility grid varies, the auxiliary machines are supplied with power from somewhere between the power-converting section and the utility grid if the frequency falls within the second predetermined range smaller than the first predetermined range. In addition, hysteresis can be implemented by setting the second predetermined range to a range smaller than the first predetermined range, thus stabilizing the switching control. Here, the normal operation means operation without variations in the frequency of the utility grid (at or below the second predetermined range).

In the above configuration, preferably, the control section measures the period of a variation in the frequency of the utility grid and controls the switching section depending on the period of the variation.

Because the switching section is controlled depending on the period of a variation in the frequency of the utility grid (the period during which the frequency is at or above the first predetermined range and the period during which the frequency is at or below the second predetermined range), the control can be performed such that, for example, the switching section is not switched if a variation in the frequency of the utility grid occurs but subsides instantly and is switched if the variation continues for a predetermined time (for example, ten seconds). This prevents frequent switching due to, for example, false detection of frequency variations, thus improving the accuracy of the switching control.

In the above configuration, preferably, the second path is connected to the third path in normal operation, and the control section controls the switching section so as to connect the first path to the third path if the voltage of the utility grid is at or above a third predetermined range serving as an allowable range of variation.

Switching is performed so as to supply the auxiliary machines with power from the direct-current link of the power-converting section if a variation in the voltage of the utility grid is at or above the third predetermined range. Thus, for example, if the grid voltage varies to such an extent as to stop the auxiliary machines (or cause the auxiliary machines to affect the operation of the power generation apparatus) even though the power generation apparatus can be operated, the auxiliary machines can be supplied with power from the power-converting section by switching the switching section to continue supplying power to the auxiliary machines while operating the power generation apparatus, thus preventing the auxiliary machines from stopping. Here, the normal operation means operation without variations in the voltage of the utility grid.

In the above configuration, preferably, the second path is connected to the third path in normal operation, and the control section controls the switching section so as to connect the second path to the third path if the voltage of the utility grid is at or below a fourth predetermined range smaller than a third predetermined range serving as an allowable range of variation.

Even if the voltage of the utility grid varies, the auxiliary machines are supplied with power from somewhere between the power-converting section and the utility grid, rather than from the power-converting section, if the voltage falls within the fourth predetermined range smaller than the third predetermined range. In addition, hysteresis can be implemented by setting the fourth predetermined range to a range smaller than the third predetermined range, thus stabilizing the switching control. Here, the normal operation means operation without variations in the voltage of the utility grid (at or below the fourth predetermined range).

In the above configuration, preferably, the control section measures the period of a variation in the voltage of the utility grid and controls the switching section depending on the period of the variation.

Because the switching section is controlled depending on the period during which the voltage is at or above the third predetermined range and the period during which the voltage is at or below the fourth predetermined range, the control can be performed such that, for example, the switching section is not switched if a variation in the voltage of the utility grid occurs but subsides instantly and is switched if the variation continues for a predetermined time (for example, ten seconds). This prevents frequent switching due to, for example, false detection of voltage variations, thus improving the accuracy of the switching control.

In the above configuration, preferably, the first path is connected to the third path in normal operation, and the control section controls the switching section so as to connect the second path to the third path if it is detected that the third converter is in an abnormal condition.

The auxiliary machines are supplied with power from the utility grid if the third converter is in an abnormal condition, thus allowing power to be supplied to the auxiliary machines irrespective of an abnormal condition in the third converter.

In the above configuration, preferably, the control section controls the switching section so as to connect the first path to the third path if it is detected that the third converter is not in an abnormal condition after the switching section connects the second path to the third path upon detection of an abnormal condition in the third converter.

The connection for supplying power from the direct-current link can be reliably restored by synchronous switching if it is detected that the third converter is not in an abnormal condition, thus allowing power to be stably supplied to the auxiliary machines irrespective of the presence or absence of frequency or voltage variations at the utility grid.

In the above configuration, preferably, the auxiliary machines include a first auxiliary machine group connected to the switching section and a second auxiliary machine group connected, without the switching section, somewhere between the power-converting section and the utility grid, the auxiliary machines included in the second auxiliary machine group are auxiliary machines that do not affect the operation of the power generation apparatus when stopped, and the auxiliary machines included in the first auxiliary machine group are auxiliary machines other than the second auxiliary machine group.

In this way, by excluding the second auxiliary machine group, which does not affect the operation of the power generation apparatus even if no power is supplied, from the auxiliary machines supplied with power from the direct-current link by limiting the auxiliary machines supplied with power from the direct-current link to the first auxiliary machine group, the size of the third converter can be reduced. Accordingly, a less expensive third inverter can be used than that used for supplying all auxiliary machines with power from the direct-current link. For example, the first auxiliary machine group includes auxiliary machines required to operate constantly, such as a governing oil pump and a lubricant oil pump, whereas the second auxiliary machine group includes auxiliary machines that operate intermittently, such as a ventilating fan and a generator-cooling fan.

A second aspect of the present invention is a power supply method applied to a power generation system including a power generation apparatus for generating electricity by means of natural energy and a power-converting section including a first converter for converting alternating-current power received from the power generation apparatus into direct-current power and a second converter for converting the direct-current power into alternating-current power matching the frequency of a utility grid, to supply power to auxiliary machines for the power generation apparatus. In the power supply method, a connection to a direct-current link between the first converter and the second converter via a third converter for converting direct-current power supplied from the direct-current link into alternating-current power is provided to form a first path, a connection to somewhere between the power-converting section and the utility grid is provided to form a second path, a connection to the auxiliary machines is provided to form a third path, and switching is performed between connection of the third path to the first path and connection of the third path to the second path.

According to this aspect, alternating-current power generated by means of natural energy is converted into direct-current power by the first converter and is converted into alternating-current power matching the frequency of the utility grid by the second converter. The first path is formed by providing a connection to the direct-current link between the first converter and the second converter via the third converter for converting the direct-current power supplied from the direct-current link into alternating-current power, the second path is formed by connecting somewhere between the power-converting section and the utility grid to the switching section, and the third path is formed by connecting the switching section to the auxiliary machines. The switching is performed between the connection of the third path to the first path and the connection of the third path to the second path.

In this way, by switching the connection path to the auxiliary machines, the power supplied to the auxiliary machines can be supplied either from the direct-current link of the power-converting section or from the line between the power-converting section and the utility grid so that a plurality of paths for supplying power to the auxiliary machines can be formed, thus providing a redundant auxiliary machine power supply.

In addition, for example, when the first path is connected to the third path, the second path is not connected to the third path and therefore does not supply power to the auxiliary machines, thus allowing an inspection procedure on a breaker, a lamp, etc. provided in the second path.

Advantageous Effects of Invention

The present invention offers the advantage of providing a duplex auxiliary machine power supply.

DESCRIPTION OF EMBODIMENTS

Embodiments of power supply devices and methods according to the present invention will be described below with reference to the drawings.

First Embodiment

In this embodiment, as a wind turbine generator, a power generation apparatus that generates electricity by means of natural energy will be described.

Figure 1:
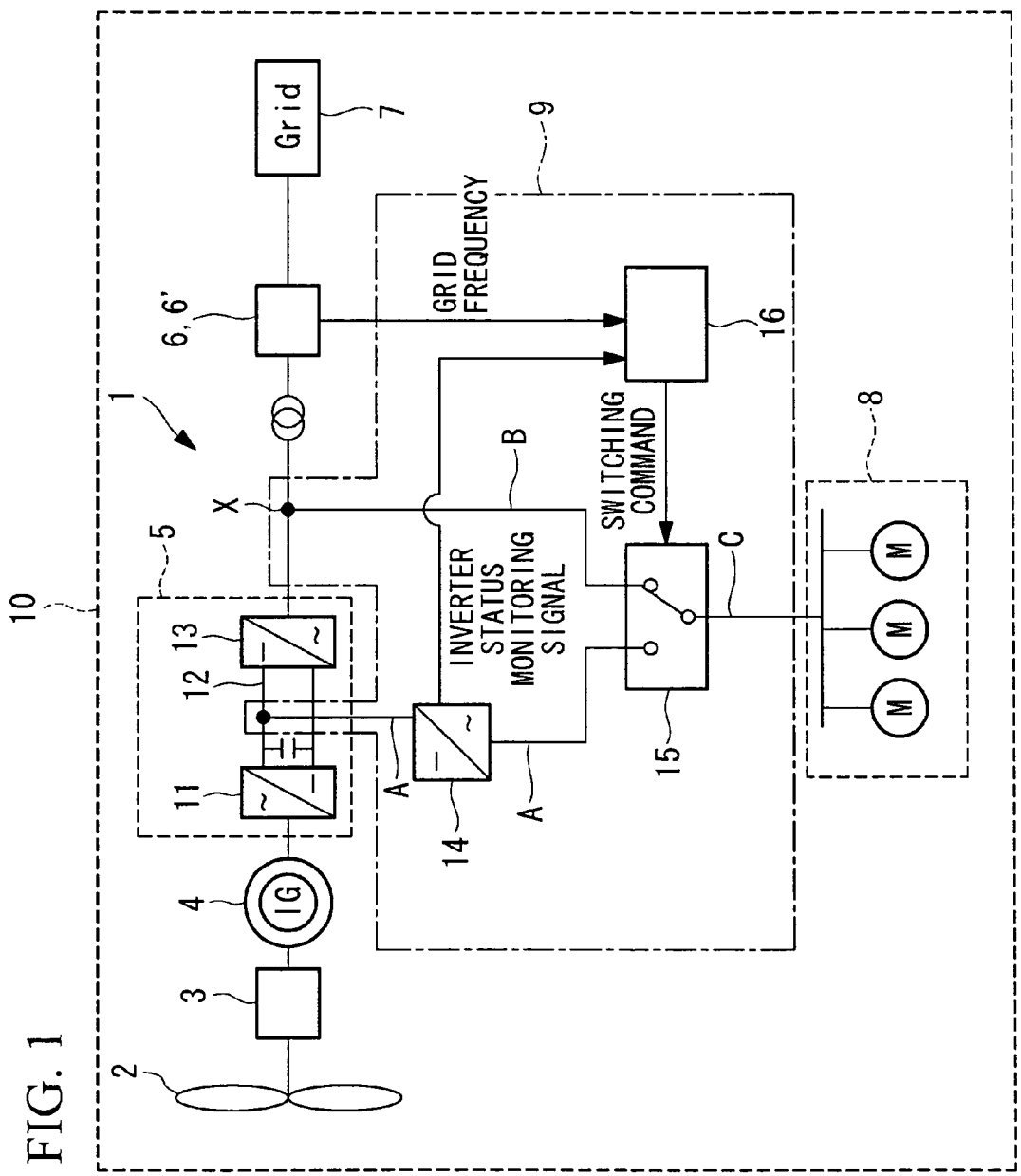
FIG. 1 is a diagram schematically showing the configuration of a wind turbine generator system according to a first embodiment of the present invention.

FIG. 1 is a block diagram schematically showing the configuration of a wind turbine generator system 10 using power supply device according to this embodiment. As shown in FIG. 1, the wind turbine generator system 10 according to this embodiment includes a wind turbine generator 1 and a power supply device 9.

The wind turbine generator 1 includes wind turbine blades 2, a gearbox 3, a generator 4, a power-converting section 5, a grid frequency sensor 6, and auxiliary machines 8.

In FIG. 1, the wind turbine blades 2 are attached to a wind turbine rotor (not shown). The generator 4 is connected to a main shaft of the wind turbine rotor via the gearbox 3, which has a predetermined gear ratio. The generator 4 is connected to a utility grid 7 via the power-converting section 5. The force of wind striking the wind turbine blades 2 in the rotation axis direction of the wind turbine rotor is converted into power for rotating the wind turbine rotor about the rotation axis direction, and the power is in turn converted into electrical energy by the generator 4.

The power-converting section 5 includes a generator-side inverter (first converter) 11, a direct-current link 12, and a grid-side inverter (second converter) 13 and converts alternating-current power received from the generator side into alternating-current power matching the frequency of the utility grid 7. The generator-side inverter 11 converts alternating-current power generated by the generator 4 into direct-current power and outputs the direct-current power to the direct-current link 12. The grid-side inverter 13 converts direct-current power received from the direct-current link 12 into alternating-current power having the same frequency as the utility grid 7 and outputs the alternating-current power.

The power-converting section 5 also has the function of converting alternating-current power received from the utility grid 7 into alternating-current power matching the frequency of the generator 4. In this case, the grid-side inverter 13 converts alternating-current power into direct-current power and outputs the direct-current power to the direct-current link 12. The generator-side inverter 11 converts direct-current power received from the direct-current link 12 into alternating-current power matching the frequency of the generator 4 and supplies the alternating-current power to the generator 4.

In addition, the power converter 5 (AC-DC-AC link) for converting the output of the generator 4 into direct current and then converting it into alternating current again with an inverter is connected to the stator side of the generator 4 for speed control etc.

The grid frequency sensor 6 measures the frequency at the utility grid 7 and outputs information about the measured grid frequency to the power supply device 9.

The auxiliary machines 8, which are machines required for operation of the wind turbine generator 1, receive power supplied from the power supply device 9.

The power supply device 9 includes an auxiliary machine power inverter (third converter) 14, a switching section 15, and a control section 16.

The auxiliary machine power inverter 14 converts direct-current power supplied from the direct-current link 12 between the generator-side inverter 11 and the grid-side inverter 13 into alternating-current power. In addition, the auxiliary machine power inverter 14 operates constantly for phase synchronization with the voltage at the utility grid 7.

The switching section 15 is connected to the direct-current link 12 via the auxiliary machine power inverter 14 to form a first path A, is connected somewhere between the power-converting section 5 and the utility grid 7 (for example, a node X in FIG. 1) to form a second path B, and is connected to the auxiliary machines 8 (or an auxiliary machine power supply for supplying power to the auxiliary machines) to form a third path C, and the switching section 15 switches between the connection of the third path C to the first path A and the connection of the third path C to the second path B. In addition, a breaker, a lamp, etc. are provided in the second path B. In this embodiment, the case where the second path B is connected to the third path C in normal operation will be described. Here, the normal operation means that the grid frequency or grid voltage varies within a predetermined range.

In addition, the switching section 15 disconnects the second path B from the third path C in order to connect the first path A to the third path C, and disconnects the first path A from the third path C in order to connect the second path B to the third path C. In this way, for example, when the first path A is connected to the third path C by switching at the switching section 15, the second path B is not connected to the third path C and therefore does not supply power to the auxiliary machines, thus allowing an inspection procedure on the breaker, the lamp, etc. provided in the second path B.

In addition, although the switching section 15 of this embodiment is described as a switch involving momentary interruption, the switching section 15 is not limited thereto. In addition, if a switch involving momentary interruption is used as the switching section 15, a line filter (noise filter) is preferably provided downstream of the switching section 15 (i.e., on the auxiliary machine 8 side). This reduces noise occurring on the auxiliary machine 8 side when the connection at the switching section 15 is switched.

The control section 16 controls the switching section 15 so as to connect the first path A to the third path C if the frequency of the utility grid 7 is at or above a first predetermined range serving as an allowable range of variation. In addition, the control section 16 may control the switching section 15 so as to connect the second path B to the third path C if the frequency of the utility grid 7 is at or below a second predetermined range smaller than the first predetermined range serving as an allowable range of variation. In this way, hysteresis may be implemented by the above first and second predetermined ranges to prevent frequent switching at the switching section 15, thus stabilizing the control.

The above first and second predetermined ranges of frequency variation are preferably between +3% and −5% and within ±2%, respectively, with respect to the rated frequency.

In addition, the control section 16 may measure the period of a variation in the frequency of the utility grid 7 and control the switching section 15 depending on the period of the variation. For example, the first predetermined range is from 0.95 pu to 1.03 pu, and the control section 16 controls the switching section 15 so as to connect the first path A to the third path C if the period during which the grid frequency is beyond the first predetermined range, namely, at or below 0.95 pu or at or above 1.03 pu, continues for ten seconds. Alternatively, the second predetermined range is from 0.95 pu to 1.03 pu, and the control section 16 controls the switching section 15 so as to connect the second path B to the third path C if the period during which the grid frequency falls within the second predetermined range continues for three or more seconds.

Although not shown, equipment, such as an interactive chopper, intended to control the current or voltage between the auxiliary machine power inverter 14 and the direct-current link 12 is inserted between the auxiliary machine power inverter 14 and the direct-current link 12.

Next, the operation of the wind turbine generator system 10 according to this embodiment will be described with reference to FIG. 1.

In normal operation, the switching section 15 connects the second path B to the third path C to supply the auxiliary machines 8 with alternating-current power from the node X between the power-converting section 5 and the utility grid 7. When the grid frequency sensor 6 detects the frequency at the utility grid 7, the information about the grid frequency is output to the power supply device 9. The control section 16 of the power supply device 9 determines whether or not the frequency of the utility grid 7 falls within the first predetermined range, which serves as an allowable range of variation, and, if it determines that the frequency is beyond the first predetermined range, outputs a switching command to the switching section 15. Upon reception of the switching command, the switching section 15 connects the first path A to the third path C.

Thus, the auxiliary machines 8 are supplied with power from the generator 4 via the direct-current link 12 and the auxiliary machine power inverter 14. In this way, if a variation in the grid frequency at the utility grid 7 is beyond the allowable range, the power supply from the utility grid 7 to the auxiliary machines 8 is switched to the power supply from the direct-current link 12 of the power-converting section 5 to the auxiliary machines 8. Thus, the auxiliary machines 8 can continue to operate irrespective of frequency variations on the utility grid 7 even if an abnormal condition occurs at the utility grid 7 and causes frequency variations contributing to a malfunction of the auxiliary machines 8.

On the other hand, the control section 16 determines whether or not the frequency of the utility grid 7 falls within the first predetermined range (or the second predetermined range), serving as an allowable range of variation, and the control section 16 outputs a switching command to the switching section 15 if it determines that the frequency falls within the first predetermined range (or the second predetermined range). Upon reception of the switching command, the switching section 15 connects the second path B to the third path C.

According to the power supply device 9 and method in this embodiment, as described above, alternating-current power generated by means of natural energy is converted into direct-current power by the generator-side inverter 11 and is converted into alternating-current power matching the frequency of the utility grid 7 by the grid-side inverter 13. The first path A is formed by connecting the direct-current link 12 between the generator-side inverter 11 and the grid-side inverter 13 to the switching section 15 via the auxiliary machine power inverter 14 for converting the direct-current power supplied from the direct-current link into alternating-current power, the second path B is formed by connecting somewhere between the power-converting section 5 and the utility grid 7 to the switching section 15, and the third path C is formed by connecting the switching section 15 to the auxiliary machines 8. Depending on the demand at the utility grid 7, the switching section 15 is switched to switch between the connection of the third path C to the first path A and the connection of the third path C to the second path B.

In this way, by switching the switching section 15, the power supplied to the auxiliary machines 8 can be supplied either from the direct-current link 12 of the power-converting section 5 or from the line between the power-converting section 5 and the utility grid 7. Accordingly, a plurality of paths for supplying power to the auxiliary machines 8 can be formed, thus providing a redundant auxiliary machine power supply. In addition, for example, when the first path A is connected to the third path C by switching the switching section 15, the second path B is not connected to the third path C and therefore does not supply power to the auxiliary machines 8, thus allowing an inspection procedure on the breaker, the lamp, etc. provided in the second path B.

First Modification

Figure 2:
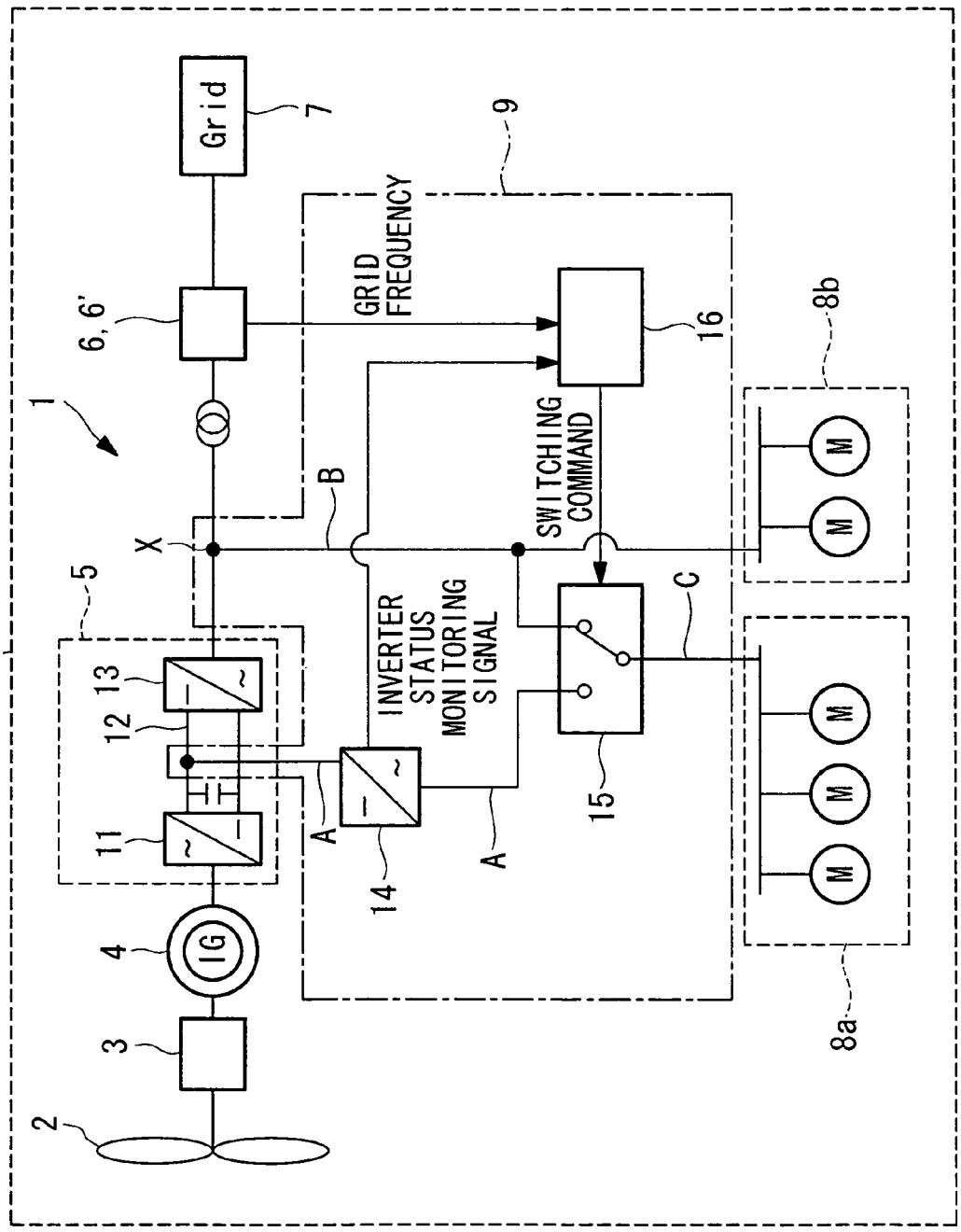
FIG. 2 is a diagram schematically showing the configuration of a wind turbine generator system according to a first modification of the first embodiment of the present invention.

As shown in FIG. 1, whereas all auxiliary machines 8 are connected via the switching section 15 (the details will be described later) in the description of this embodiment, the connection is not limited thereto. For example, as shown in FIG. 2, the auxiliary machines 8 may be distinguished between a first auxiliary machine group 8a connected to the switching section 15 and a second auxiliary machine group 8b connected, without the switching section 15, somewhere between the power-converting section 5 and the utility grid 7 to supply the auxiliary machine groups 8a and 8b with power from different sources. If the auxiliary machines 8 are to be distinguished between the first auxiliary machine group 8a and the second auxiliary machine group 8b, the auxiliary machines included in the second auxiliary machine group 8b are auxiliary machines that do not affect the operation of the wind turbine generator 1 when stopped, whereas the auxiliary machines included in the first auxiliary machine group 8a are auxiliary machines other than the second auxiliary machine group 8b. For example, the first auxiliary machine group 8a includes auxiliary machines required to operate constantly, such as a governing oil pump and a lubricant oil pump. The second auxiliary machine group 8b includes auxiliary machines that operate intermittently, such as a ventilating fan and a generator-cooling fan.

In this way, by excluding the second auxiliary machine group 8b, which does not affect the operation of the wind turbine generator 1 even if no power is supplied, from the auxiliary machines supplied with power from the direct-current link 12 by limiting the auxiliary machines supplied with power from the direct-current link 12 to the first auxiliary machine group 8a, the size of the auxiliary machine power inverter 14 of the power supply device 9 required for supplying power can be reduced. Accordingly, a less expensive inverter can be used as the auxiliary machine power inverter 14 of the power supply device 9 than that used as the auxiliary machine power inverter 14 of the power supply device 9 to supply power to all auxiliary machines 8.

Second Modification

In addition, whereas the grid frequency sensor 6 is provided on the utility grid 7 side and the control section 16 controls the switching section 15 depending on the grid frequency at the utility grid 7 in the description of this embodiment, the control method is not limited thereto. For example, a grid voltage sensor 6' may be provided instead of the grid frequency sensor 6, and the control section 16 may control the switching section 15 depending on the grid voltage at the utility grid 7 using the grid voltage sensor 6'. In this case, the control section 16 controls the switching section 15 so as to connect the first path A to the third path C if the voltage of the utility grid 7 is at or above a third predetermined range serving as an allowable range of variation. In addition, the control section 16 controls the switching section 15 so as to connect the second path B to the third path C if the voltage of the utility grid 7 is at or below a fourth predetermined range smaller than the third predetermined range serving as an allowable range of variation.

Thus, for example, if the grid voltage 7 varies to such an extend as to stop the auxiliary machines 8 (or cause the auxiliary machines to affect the operation of the wind turbine generator 1) even though the wind turbine generator 1 can be operated, the auxiliary machines 8 can be supplied with power from the direct-current link 12 of the power-converting section 5 by switching the switching section 15 to continue supplying power to the auxiliary machines 8 while operating the wind turbine generator 1, thus preventing the auxiliary machines 8 from stopping.

Third Modification

Figure 3A:
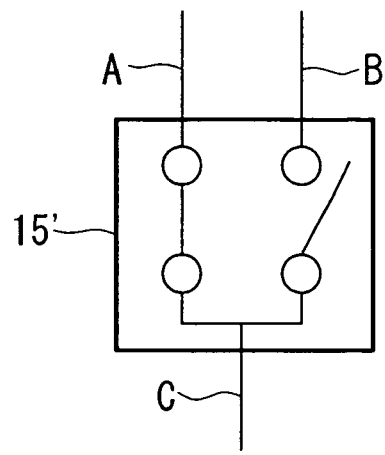
FIG. 3A is a diagram illustrating a switching section supporting uninterruptible switching.
Figure 3B:
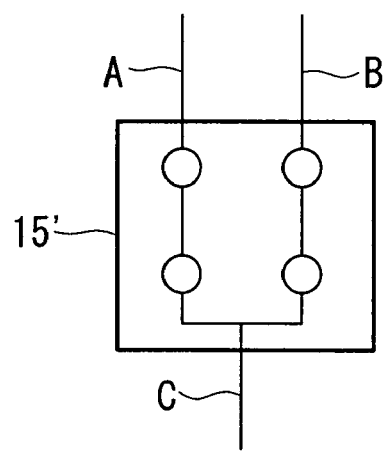
FIG. 3B is a diagram illustrating the switching section supporting uninterruptible switching.
Figure 3C:
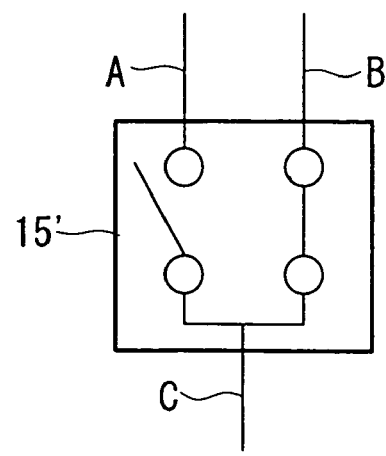
FIG. 3C is a diagram illustrating the switching section supporting uninterruptible switching.

In addition, whereas the path of the power supplied to the auxiliary machines 8 is switched using the switching section 15 involving momentary interruption in the description of this embodiment, a switching section 15' that performs synchronous switching (uninterruptible switching) without momentary interruption during switching may be used instead of the switching section 15 involving momentary interruption. For uninterruptible switching, for example, as shown in FIGS. 3A to 3C, a parallel switch is used as the switching section 15' and, if switching is performed from the state where the first path A is connected to the third path C (FIG. 3A), the second path B is connected to the third path C, with the first path A being connected to the third path C (FIG. 3B), and the first path A is disconnected from the third path C after the second path B is connected to the third path C (FIG. 3C). In this way, the path can be switched stepwise, thus preventing momentary interruption and eliminating the need for a line filter (noise filter).

In addition, for example, if lightning is predicted according to weather information, and it is predicted to cause frequency variations or voltage variations at the utility grid 7, the auxiliary machines 8 are supplied with power from the direct-current link 12. In this way, if variations are predicted and accordingly the switching section 15 is switched in advance, the above uninterruptible switching can be performed to continue the operation of the auxiliary machines 8 without momentary interruption.

Second Embodiment

Figure 4:
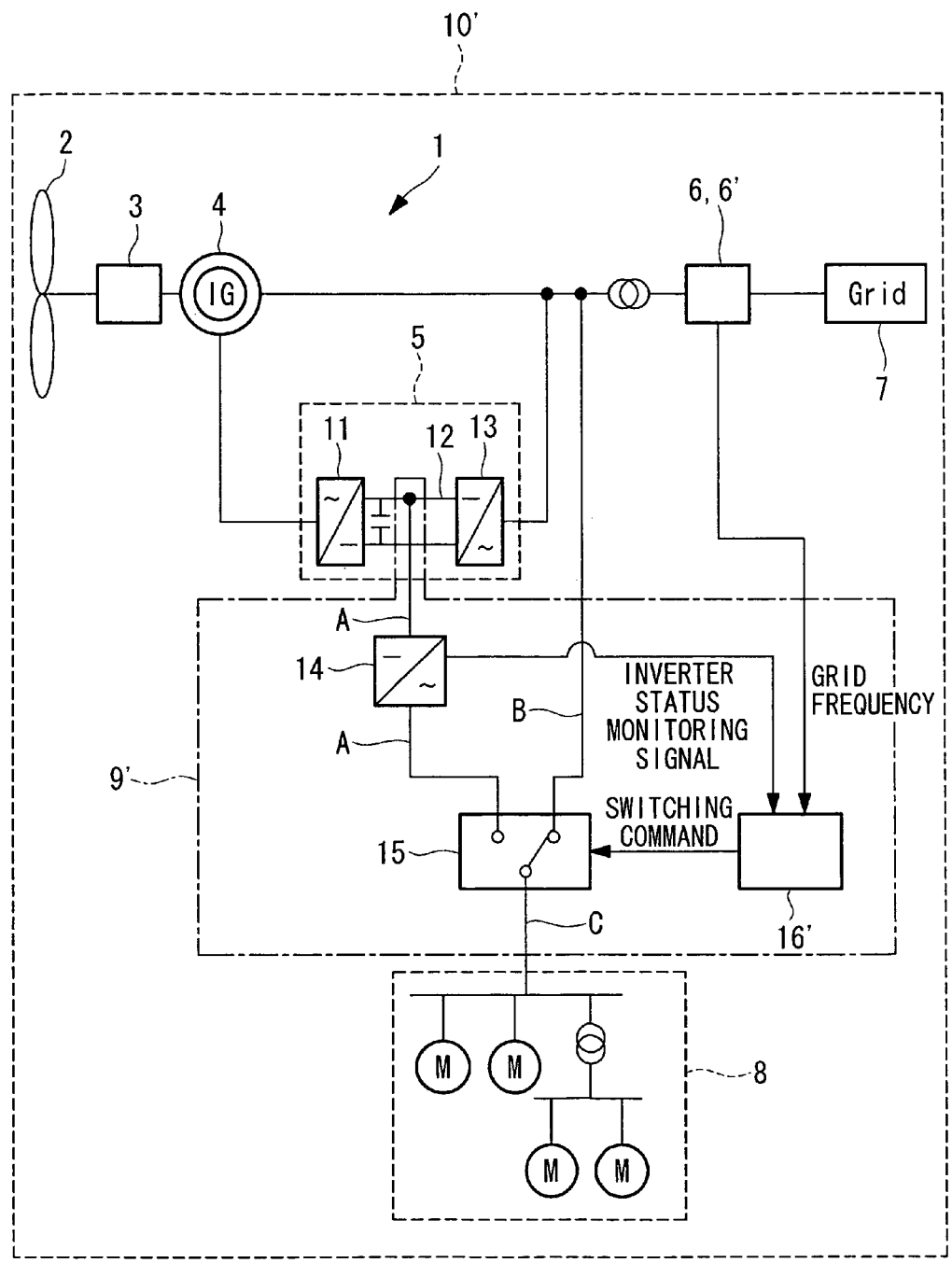
FIG. 4 is a diagram schematically showing the configuration of a wind turbine generator system according to a second embodiment of the present invention.

Next, a power supply device 9' according to a second embodiment of the present invention will be described using FIG. 4.

Whereas the path of the power supplied to the auxiliary machines 8 is switched depending on variations in the status of the utility grid 7 (for example, frequency variations or voltage variations) in the first embodiment described above, this embodiment differs from the above first embodiment in that the switching timing of the switching section is controlled depending on the status of the auxiliary machine power inverter 14. For a wind turbine generator system 10' according to this embodiment, a description of the same points as in the first embodiment will be omitted, and different points will be mainly described below. In this embodiment, additionally, a configuration using a wound-rotor induction motor as a generator, namely, a double-fed (secondary excitation) wind turbine generator system 10', will be described.

In this embodiment, additionally, the case where the first path A is connected to the third path C in normal operation will be described. Here, the normal operation means that the auxiliary machine power inverter 14 is not in an abnormal condition.

The auxiliary machine power inverter 14 has a self-diagnosis function and notifies a control section 16' about the result of detection.

The control section 16' receives the result of detection concerning the presence or absence of an abnormal condition from the auxiliary machine power inverter 14 and controls the switching section 15 depending on that result. Specifically, if it is detected that the auxiliary machine power inverter 14 is in an abnormal condition, the control section 16' controls the switching section 15 so as to connect the second path B to the third path C.

On the other hand, if it is detected that the auxiliary machine power inverter 14 is not in an abnormal condition, the control section 16' controls the switching section 15 so as to connect the first path A to the third path C. In this way, the control section 16' monitors the status of the auxiliary machine power inverter 14 (for example, executes determination based on the presence or absence of a notification of the self-diagnosis function) and controls the switching section 15 so as to connect the second path B to the third path C if the auxiliary machine power inverter 14 malfunctions.

Next, the operation of the wind turbine generator system 10' according to this embodiment will be described with reference to FIG. 4.

In normal operation, the switching section 15 connects the first path A to the third path C so that the auxiliary machine power inverter 14 converts direct-current power supplied from the direct-current link 12 into alternating-current power and supplies the alternating-current power to the auxiliary machines 8. When it is detected that the auxiliary machine power inverter 14 is in an abnormal condition, the information about the abnormal condition is output to the control section 16'. If the control section 16' receives the information about the abnormal condition in the auxiliary machine power inverter 14, it outputs, to the switching section 15, a switching command for controlling the switching section 15 so as to connect the second path B to the third path C. Thus, the switching section is switched to connect the second path B to the third path C so that the auxiliary machines 8 are supplied with alternating-current power from the node X between the power-converting section 5 and the utility grid 7 via the second path B and the third path C. In this way, if it is detected that the auxiliary machine power inverter 14 is in an abnormal condition, the power supply from the direct-current link 12 is switched to the power supply from the utility grid 7 so that the auxiliary machines 8 can continue to operate.

On the other hand, if it is detected that the auxiliary machine power inverter 14 has returned to a normal condition, the information about the normal condition is output to the control section 16'. Based on the information about the normal condition, the control section 16' outputs a switching command for connecting the first path A to the third path C to the switching section 15 to supply the auxiliary machines 8 with power from the direct-current link 12. In the switching section 15, the path is switched on the basis of the received switching command to connect the first path A to the third path C.

In this way, if the control section 16' detects a malfunction of the auxiliary machine power inverter 14, it controls the switching section 15 so as to connect the second path B to the third path C. In addition, a breaker, a lamp, etc. are provided in the second path B and, when the breaker, the lamp, etc. are to be inspected, the control section 16' may execute the control so as to connect the first path A to the third path C.

According to the power supply device 9' and method in this embodiment, as described above, the auxiliary machines 8 are supplied with power from the utility grid 7 if the auxiliary machine power inverter 14 is in an abnormal condition, thus allowing power to be supplied to the auxiliary machines 8 irrespective of the abnormal condition in the auxiliary machine power inverter 14. In addition, power can be supplied from the direct-current link 12 if it is detected that the auxiliary machine power inverter 14 is not in an abnormal condition, thus allowing power to be stably supplied to the auxiliary machines 8 irrespective of the presence or absence of frequency or voltage variations at the utility grid 7.

REFERENCE SIGNS LIST

1 wind turbine generator
4 generator
5 power-converting section
6 grid frequency sensor
8 auxiliary machine
9 power supply device
10 wind turbine generator system
11 generator-side inverter
12 direct-current link
13 grid-side inverter
14 auxiliary machine power inverter
15 switching section
16 control section

The invention claimed is:

1. A power supply device applied to a power generation system including a power generation apparatus for generating electricity by natural energy and a power-converting section including a first converter for converting alternating-current power received from the power generation apparatus into direct-current power and a second converter for converting the direct-current power into alternating-current power matching a frequency of a utility grid, to supply power to auxiliary machines for the power generation apparatus, the power supply device comprising:

a switching section that is connected to a direct-current link between the first converter and the second converter via a third converter for converting direct-current power supplied from the direct-current link into alternating-current power to form a first path, that is connected between the power-converting section and the utility grid to form a second path, and that is connected to the auxiliary machines to form a third path, the switching section switching between connection of the third path to the first path and connection of the third path to the second path.

2. The power supply device according to claim 1, further comprising a control section that controls the switching section depending on at least one of a status of the utility grid and a status of the direct-current link.

3. The power supply device according to claim 2, wherein the control section connects the third path to the first path by switching the switching section when at least one of the frequency and a voltage at the utility grid is predicted to vary by a predetermined amount.

4. The power supply device according to claim 2, wherein the second path is connected to the third path in normal operation; and the control section controls the switching section so as to connect the first path to the third path when the frequency of the utility grid is at a first predetermined range serving as an allowable range of variation.

5. The power supply device according to claim 2, wherein the control section controls the switching section so as to connect the second path to the third path when the frequency of the utility grid is at a second predetermined range smaller than a first predetermined range serving as an allowable range of variation.

6. The power supply device according to claim 2, wherein the control section measures a period of a variation in the frequency of the utility grid and controls the switching section depending on the period of the variation.

7. The power supply device according to claim 2, wherein the second path is connected to the third path in normal operation; and the control section controls the switching section so as to connect the first path to the third path when a voltage of the utility grid is at a first predetermined range serving as an allowable range of variation.

8. The power supply device according to claim 2, wherein the control section controls the switching section so as to connect the second path to the third path when a voltage of the utility grid is at a second predetermined range smaller than a first predetermined range serving as an allowable range of variation.

9. The power supply device according to claim 2, wherein the control section measures a period of a variation in a voltage of the utility grid and controls the switching section depending on the period of the variation.

10. The power supply device according to claim 2, wherein the first path is connected to the third path in normal operation; and the control section controls the switching section so as to connect the second path to the third path when it is detected that the third converter is in an abnormal condition.

11. The power supply device according to claim 2, wherein the control section controls the switching section so as to connect the first path to the third path when it is detected that the third converter is not in an abnormal condition after the switching section connects the second path to the third path upon detection of the abnormal condition in the third converter.

12. The power supply device according to claim 1, wherein the auxiliary machines include a first auxiliary machine group connected to the switching section and a second auxiliary machine group connected, without the switching section, somewhere between the power-converting section and the utility grid;

the auxiliary machines included in the second auxiliary machine group are auxiliary machines that do not affect the operation of the power generation apparatus when stopped; and the auxiliary machines included in the first auxiliary machine group are auxiliary machines other than the second auxiliary machine group.

13. A power supply method applied to a power generation system including a power generation apparatus for generating electricity by natural energy and a power-converting section including a first converter for converting alternating-current power received from the power generation apparatus into direct-current power and a second converter for converting the direct-current power into alternating-current power matching the frequency of a utility grid, to supply power to auxiliary machines for the power generation apparatus, the method comprising:

forming a first path with a connection to a direct-current link between the first converter and the second converter via a third converter for converting direct-current power supplied from the direct-current link into alternating-current power;

forming a second path with a connection between the power-converting section and the utility grid;

forming a third path with a connection between the auxiliary machines and a switching section; and switching a connection of the third path to the first path and a connection of the third path to the second path.

* * * * *